(12) United States Patent
Yoo

(10) Patent No.: US 10,581,849 B2
(45) Date of Patent: Mar. 3, 2020

(54) DATA PACKET TRANSMISSION METHOD, DATA PACKET AUTHENTICATION METHOD, AND SERVER THEREOF

(71) Applicant: SAMSUNG SDS CO., LTD., Seoul (KR)

(72) Inventor: In-Seon Yoo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 196 days.

(21) Appl. No.: 15/798,882

(22) Filed: Oct. 31, 2017

(65) Prior Publication Data
US 2018/0124048 A1   May 3, 2018

(30) Foreign Application Priority Data
Oct. 31, 2016   (KR) .................. 10-2016-0142746

(51) Int. Cl.
| | |
|---|---|
| H04L 29/06 | (2006.01) |
| H04L 9/08 | (2006.01) |
| H04L 9/32 | (2006.01) |
| H04W 4/70 | (2018.01) |
| G06F 21/44 | (2013.01) |

(52) U.S. Cl.
CPC .......... *H04L 63/0876* (2013.01); *G06F 21/44* (2013.01); *H04L 9/0833* (2013.01); *H04L 9/0836* (2013.01); *H04L 9/3236* (2013.01); *H04L 9/3247* (2013.01); *H04L 63/065* (2013.01); *H04L 63/126* (2013.01); *H04W 4/70* (2018.02); *H04L 2209/38* (2013.01)

(58) Field of Classification Search
CPC .................. H04L 63/0876; H04L 9/0833
See application file for complete search history.

(56) References Cited

U.S. PATENT DOCUMENTS

| | | | |
|---|---|---|---|
| 8,806,160 B2* | 8/2014 | Colgrove | G06F 3/0608 711/162 |
| 9,003,346 B1* | 4/2015 | Dutta | G06F 17/5072 716/118 |
| 2005/0213553 A1* | 9/2005 | Wang | H04L 63/1416 370/349 |

(Continued)

FOREIGN PATENT DOCUMENTS

| | | |
|---|---|---|
| KR | 101002022 B1 | 12/2010 |
| KR | 1020120004715 A | 1/2012 |
| KR | 101347821 B1 | 1/2014 |

OTHER PUBLICATIONS

Communication dated Feb. 8, 2018, issued by the Korean Patent Office in counterpart Korean Application No. 10-2016-0142746.

*Primary Examiner* — Ali Shayanfar
(74) *Attorney, Agent, or Firm* — Sughrue Mion, PLLC

(57) ABSTRACT

Disclosed are a data transmission method, an authentication method, and a server. The data transmission method performed by a node among a plurality of nodes connected in a hierarchical structure includes generating a node identity (ID) comprising at least one from among a virtual address for identifying the node and a group key for identifying a group to which the node belongs, generating a signature of the node by using at least one from among the node ID and information about a previous node adjacent to the node, and transmitting a data packet to a server using a node chain formed based on signatures of the nodes.

14 Claims, 15 Drawing Sheets

(56) References Cited

U.S. PATENT DOCUMENTS

| | | | |
|---|---|---|---|
| 2008/0244739 A1* | 10/2008 | Liu | H04L 63/1458 726/22 |
| 2008/0301303 A1* | 12/2008 | Matsuoka | H04L 12/4645 709/227 |
| 2009/0217029 A1* | 8/2009 | Ilac | H04L 9/0822 713/151 |
| 2011/0208972 A1* | 8/2011 | Liu | H04L 9/3073 713/179 |
| 2014/0357229 A1* | 12/2014 | Lee | H04W 12/04 455/411 |
| 2015/0082399 A1* | 3/2015 | Wu | G06F 21/6209 726/6 |
| 2017/0012778 A1* | 1/2017 | Choyi | H04L 63/0884 |
| 2017/0344758 A1* | 11/2017 | Matsuo | G06F 21/64 |
| 2018/0019976 A1* | 1/2018 | Ben-Shalom | H04L 9/14 |
| 2018/0048462 A1* | 2/2018 | Salmela | H04W 12/06 |
| 2018/0332047 A1* | 11/2018 | Shah | H04L 63/20 |

* cited by examiner

DATA PACKET TRANSMISSION METHOD, DATA PACKET AUTHENTICATION METHOD, AND SERVER THEREOF

CROSS-REFERENCE TO RELATED APPLICATION

This application claims priority to and the benefit of Korean Patent Application No. 10-2016-0142746, filed on Oct. 31, 2016, the disclosure of which is incorporated herein by reference in its entirety.

BACKGROUND

1. Field

The present disclosure relates to a technology for transmitting data and authenticating an Internet of things (IoT) device, and more particularly, to a method of transmitting data, an authentication method, and a server.

2. Discussion of Related Art

Recently, with the development of information and communications technology (ICT), services based on IoT devices are gradually increasing. However, up to now, a cloud server merely issues a token or an authentication certificate to an IoT device or a hub to authenticate the device. Accordingly, unauthenticated devices frequently transmit data packets to the cloud server via the IoT device or the hub. In this case, the probability of an unauthorized device accessing the cloud server is relatively increased, and in particular there is an increased risk of an IoT device infected with malicious code accessing the cloud server through a hacking tool such as a thingbot.

SUMMARY

The present disclosure is directed to reducing the probability of access by an unauthorized device and an unauthorized packet through authenticating Internet of things (IoT) devices on the basis of a node chain and verifying data packets transmitted by the authenticated IoT device.

According to an aspect of the present disclosure, there is provided a data transmission method performed by a node among a plurality of nodes connected in a hierarchical structure, the method comprising: generating a node identity (ID) comprising at least one from among a virtual address for identifying the node and a group key for identifying a group to which the node belongs; generating a signature of the node by using at least one from among the node ID and information about a previous node adjacent to the node; and transmitting a data packet to a server using a node chain formed based on signatures of the nodes.

The generating of the signature of the node may comprise generating the signature of the node by hashing the node ID in response to there being no previous node adjacent to the node, and generating the signature of the node by hashing the node ID and a hash value of a signature of at least one previous node in response to the at least one previous node being adjacent to the node.

The generating of the signature of the node may include regenerating the signature of the node in response to a connection of the nodes changing.

The transmitting of the data packet to the server may include: receiving, by the node, the data packet from the previous node adjacent to the node; verifying, by the node, a data hash value included in the data packet received from the previous node by using a signature of the previous node; and receiving, by a next node adjacent to the node, the data packet from the node in response to the data hash value being verified.

At least a part of the data packet of the previous node may be hashed to obtain the data hash value by using the signature of the previous node as a key.

According to another aspect of the present disclosure, there is provided an authentication method performed by a server connected to a node among a plurality of nodes connected in a hierarchical structure, the method comprising: registering node identities (IDs) of the nodes including at least one from among virtual addresses for identifying the nodes and group keys for identifying groups to which the nodes belong; registering signatures of the nodes generated from combinations of at least one from among the node IDs and information on previous nodes adjacent to the nodes; and authenticating a data packet transmitted along a node chain formed based on the signatures of the nodes by using the registered signatures.

A signature of each of the nodes may be a hash value of a corresponding node ID in response to there being no previous node adjacent to the node, and is a value obtained by hashing the node ID and a hash value of a signature of at least one previous node in response to the at least one previous node being adjacent to the node.

The registered signatures of the nodes may be updated in response to a connection of the nodes changing.

The authentication method may further include, before the authenticating of the data packet, receiving the data packet including a data hash value and data from a node at a highest level, and at least a part of the data packet of the node at the highest level may be hashed to obtain the data hash value by using a signature of the node at the highest level as a key.

The authenticating of the data packet may include verifying the data hash value by using the registered signature of the node at the highest level to authenticate the data packet.

The authentication method may further include, after the authenticating of the data packet, determining the data packet to be an unauthorized packet in response to the authentication of the data packet failing or a format of the data packet differing from a set format.

According to another aspect of the present disclosure, there is provided a server connected to a node among a plurality of nodes connected in a hierarchical structure, the server comprising: a register configured to: register node identities (IDs) of the nodes, the node IDs comprising at least one from among virtual addresses for identifying the nodes and group keys for identifying groups to which the nodes belong; and register signatures of the nodes generated from combinations of at least one from among the node IDs and information about previous nodes adjacent to the nodes; and an authenticator configured to authenticate a data packet transmitted along a node chain formed based on the signatures of the nodes by using the registered signatures.

The signature of each of the nodes may be a hash value of a corresponding node ID in response to there being no previous node adjacent to the node, and is a value obtained by hashing the node ID and a hash value of a signature of at least one previous node in response to the at least one previous node being adjacent to the node.

The registered signatures of the nodes may be updated in response to a connection of the nodes changing.

The authenticator may be further configured to receive the data packet including a data hash value and data from a node at a highest level, wherein at least a part of the data packet of the node at the highest level is hashed by using a signature of the node at the highest level as a key to obtain the data hash value.

The authenticator may be further configured to verify the data hash value by using the signature of the node at the highest level to authenticate the data packet.

The server may further include an unauthorized packet determiner configured to determine the data packet to be an unauthorized packet in response to the authentication of the data packet failing or a format of the data packet differing from a set format.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present disclosure will be described in detail with reference to the drawings. The following detailed description is provided to help comprehensive understanding of a method, an apparatus, and/or a system disclosed herein. However, this is merely exemplary, and the present disclosure is not limited thereto.

While describing the present disclosure, when it is determined that a detailed description of a known art related to the present disclosure may unnecessarily obscure the gist of the present disclosure, the detailed description will be omitted. Terms which will be used below are defined in consideration of functionality in the present disclosure, which may vary according to an intention of a user or an operator or a usual practice. Therefore, definitions thereof should be made on the basis of the overall contents of this specification. Terminology used herein is for the purpose of describing exemplary embodiments of the present disclosure only and is not intended to be limiting. The singular forms are intended to include the plural forms as well, unless the context clearly indicates otherwise. It should be understood that the terms "comprises," "comprising," "includes," and "including," when used herein, specify the presence of stated features, numerals, steps, operations, elements, or combinations thereof, but do not preclude the presence or addition of one or more other features, numerals, steps, operations, elements, or combinations thereof.

Figure 1:
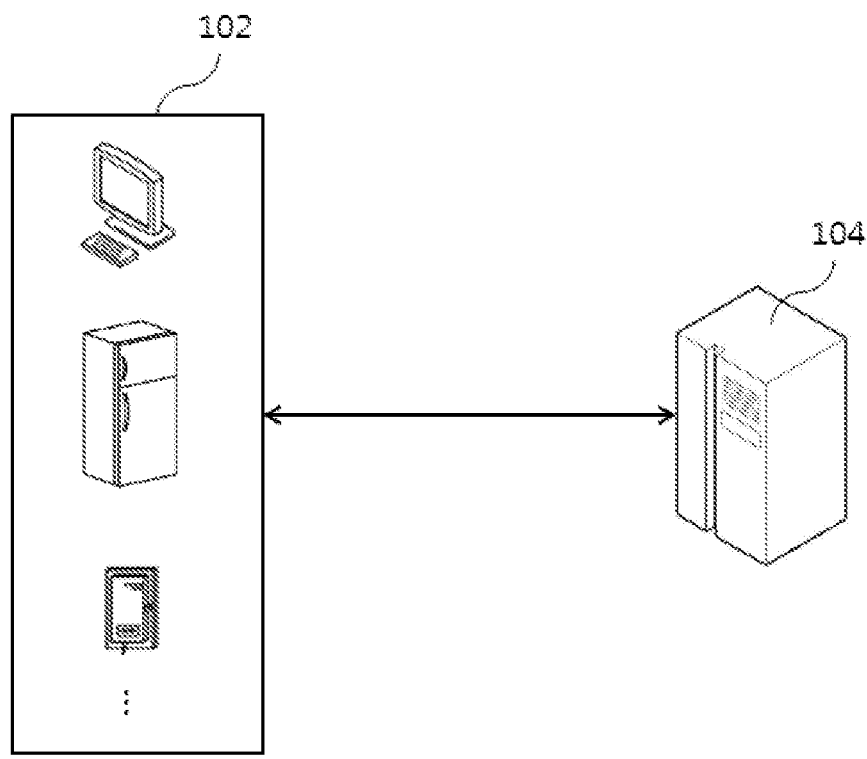
FIG. 1 is a diagram showing a detailed configuration of an authentication system according to an exemplary embodiment of the present disclosure.

FIG. 1 is a diagram showing a detailed configuration of an authentication system 100 according to an exemplary embodiment of the present disclosure. As shown in FIG. 1, the authentication system 100 according to an exemplary embodiment of the present disclosure includes a plurality of Internet of Things (IoT) devices 102 and a server 104.

The IoT devices 102 are terminals capable of transmitting and receiving data packets in an IoT environment. For example, the IoT devices 102 may be communication devices such as a smart phone, a desktop computer, and the like, home appliances such as a refrigerator, a television (TV), an audio device, and the like, and also various devices such as industrial equipment, factory equipment, a hub, and the like. The plurality of IoT devices 102 may form one or more networks, and at least one of the IoT devices 102 may be connected to the server 104. Also, the plurality of IoT devices 102 may be connected to each other in multiple levels while having a hierarchical structure. From here on, each IoT device 102 will be referred to as one node 102 for convenience of description. In other words, n number of IoT devices 102 may be referred to as n number of nodes 102, and each node 102 may be present at any one level from level 1 (the lowest level) to level N (the highest level). A node 102 at a low level may transmit a data packet to a node 102 at a high level, and the node 102 at the highest level may transmit a data packet received from an adjacent previous node (i.e., an adjacent node at a lower level) to the server 104.

To this end, each node 102 may generate a node identity (ID) including at least one of a virtual address for identifying the node 102 and a group key for identifying a group to which the node 102 belongs. The node ID is an ID used to identify each node 102 and may be a combination of a virtual address and a group key. The virtual address and the group key will be described in detail below with reference to FIGS. 3 and 4.

Each node 102 may generate a signature using at least one of a node ID and information on a previous node adjacent thereto (i.e., information on an adjacent node at a lower level). The signature may be a hash-based signature by way of example. As an example, when there is no previous node adjacent to a node 102 (i.e., when the node 102 is at the lowest level), the node 102 may generate a signature thereof by hashing a node ID thereof. Also, when there is a previous node adjacent to a node 102 (i.e., when the node 102 is not at the lowest level), the node 102 may generate a signature thereof by hashing a node ID thereof and a hash value of a signature of at least one previous node. Further, when the connection of individual nodes 102 is changed, each node 102 may regenerate (dynamically calculate) a signature thereof. For example, when a new node 102 is added or an existing node 102 is removed, the connection of individual nodes 102 may be changed, and in this case, each node 102 may regenerate a signature thereof according to the changed connection of nodes 102.

In this way, each node 102 may generate a hash-based signature using at least one of a node ID thereof and information on an adjacent previous node, and in this case, a node chain (or an ID chain) may be formed on the basis of signatures of individual nodes 102. In exemplary embodiments of the present disclosure, a node chain is a set of connecting links which represent the connection relation (or a connection state) between individual nodes 102 (i.e., a network topology of the individual nodes 102), and a data packet may be sequentially transferred along the node chain and finally transferred to a node 102 at the highest level. The node 102 at the highest level may transmit the data packet to the server 104.

Also, each node 102 may register a node ID and a signature in the server 104, and node IDs and signatures registered in the server 104 may be used to authenticate a data packet transmitted to the server and nodes 102 which transmit the data packet.

The server 104 is connected to at least one of the plurality of nodes 102, receives a data packet from the connected node 102, and authenticates the data packet and nodes 102 which transmit the data packet. To this end, the server 104 may register a node ID and a signature of each node 102 in conjunction with at least one of the plurality of nodes 102, and authenticate the data packet and nodes 102 which transmit the data packet by using registered node IDs and registered signatures of the individual nodes 102. Also, the server 104 may determine whether the received data packet is an unauthorized packet or an abnormal packet and block the data packet accordingly. A process in which individual nodes 102 transmit a data packet and a process in which the server 104 authenticates the data packet and the nodes 102 will be described in detail below with reference to FIGS. 2 to 15.

Figure 2:
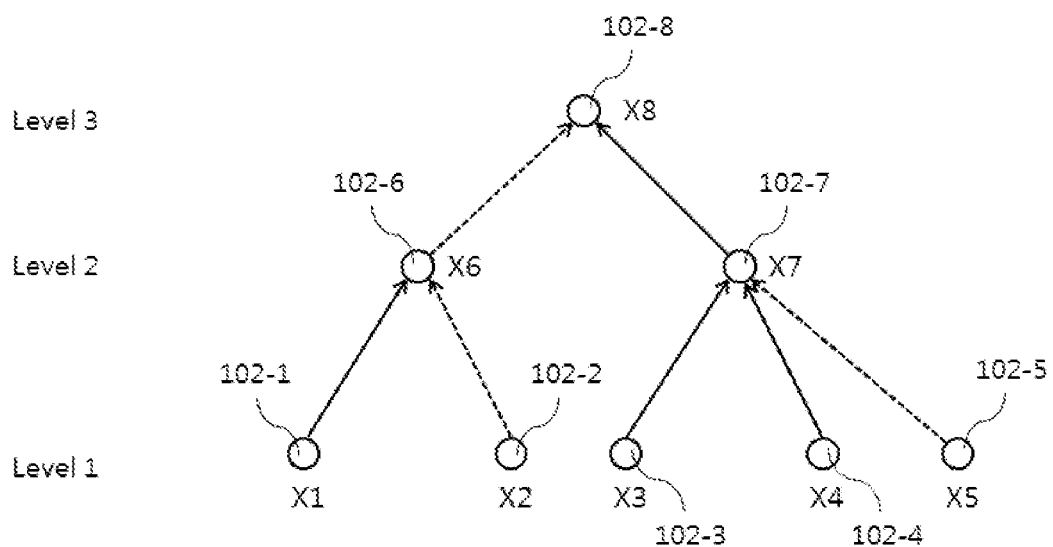
FIG. 2 is an example diagram of individual nodes according to an exemplary embodiment of the present disclosure.

FIG. 2 is an example diagram of individual nodes 102 according to an exemplary embodiment of the present disclosure.

Referring to FIG. 2, a plurality of nodes 102-1 to 102-8 may be connected to each other in multiple levels while having a hierarchical structure, and may form at least one network. As an example, X1 102-1 to X5 102-5 may be at the lowest level (e.g., level 1), and X8 102-8 may be at the highest level (e.g., level 3) and connected to the server 104. Also, X1 102-1 and X2 102-2 may be previous nodes adjacent to X6 102-6, and X8 102-8 may be a next node adjacent to X6 102-6. X1 102-1 to X8 102-8 may belong to the same group, and in this case, X1 102-1 to X8 102-8 generate the same group key. The connection of the plurality of nodes 102 may be changed when a new node 102 is added or an existing node 102 is removed. In FIG. 2, for convenience of description, a fixed connection between nodes 102 is indicated by a solid line, and an unfixed connection between nodes 102 is indicated by a broken line. However, the number and the connection of nodes 102 shown in FIG. 2 are merely exemplary, and the number and the connection of nodes 102 are not limited thereto.

Figure 3:
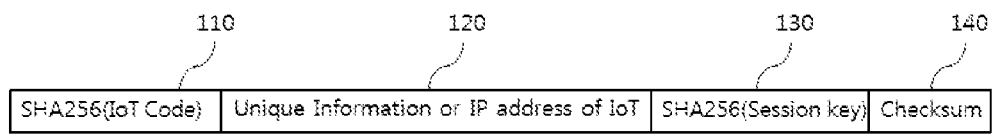
FIG. 3 is an example diagram of a virtual address according to an exemplary embodiment of the present disclosure.

FIG. 3 is an example diagram of a virtual address 106 according to an exemplary embodiment of the present disclosure. The virtual address 106 is information for identifying each node 102 and may be generated by each node 102.

Specifically, each node 102 may generate a hash value 110 of a code thereof by applying a hash algorithm (e.g., SHA-256) to the code. Here, the code of the node 102 (i.e., an IoT device) is a name for identifying the node 102 and may be a name representing, for example, a serial number of the node 102, a function or a service provided by the node 102, or the like. As an example, the code of the node 102 may be "Heat Sensor AXXXX," "Light Sensor LXXXX," and the like.

Also, each node 102 may acquire a session key and generate a hash value 130 of the acquired session key by applying a hash algorithm (e.g., SHA-256) to the session key. Here, each node 102 may acquire a session key for generating the virtual address 106 in conjunction with the server 104. Specifically, each node 102 may exchange seed values with the server 104 in every communication session and generate a session key identical to a session key that the server 104 has by using the exchanged seed values. In this case, the session key for generating the virtual address 106 may be a session key generated in an initial communication session between the node 102 and the server 104. For example, Diffie-Hellman key exchange may be used to exchange seed values and generate a session key, and various methods for exchanging seed values and then generating a final value on both sides without transmitting and receiving the final value may be used.

Further, each node 102 may generate a checksum of the hash value 110 of a code thereof, unique information or an Internet protocol (IP) address thereof, and the hash value 130 of the session key.

As shown in FIG. 3, the virtual address 106 generated in this process may include the hash value 110 of the code of the node 102, the unique information or the IP address of the node 102, the hash value 130 of the session key, and the checksum 140. According to an exemplary embodiment, a process of converting a binary value of the generated virtual address 106 into text form may be added.

Meanwhile, the virtual address 106 shown in FIG. 3 is exemplary, and a virtual address 106 generated by each node 106 is not necessarily generated according to the example shown in the drawing.

In addition, each node 102 may transfer a virtual address (or a node ID generated from the virtual address) thereof to an adjacent next node, and this process is repeated to transfer virtual addresses (or node IDs) of individual nodes 102 to a node 102 at the highest level. The node 102 at the highest level transmits the virtual addresses (or the node IDs) of the individual nodes 102 to the server 104, so that the virtual addresses (or the node IDs) of the individual nodes 102 may be registered in the server 104.

Figure 4:
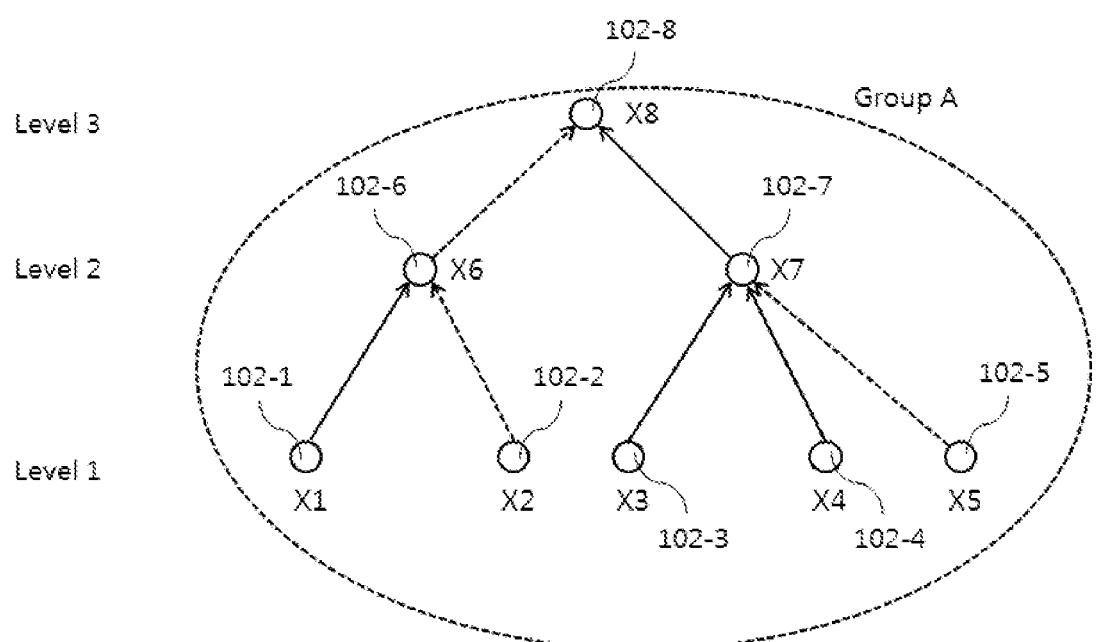
FIG. 4 is a diagram illustrating a process of generating a group key according to an exemplary embodiment of the present disclosure.

FIG. 4 is a diagram illustrating a process of generating a group key according to an exemplary embodiment of the present disclosure. As described above, each node 102 may generate a group key of a group to which the node 102 belongs. In FIG. 4, it is assumed that X1 102-1 to X8 102-8 belong to the same group (e.g., group A).

Specifically, each node 102 may identify a group to which the node 102 belongs on the basis of a specific unique value included in a header of a data packet transmitted by the node 102, and generate a group key corresponding to the identified group. For example, the unique value may be information representing a type of a network to which the node 102 belongs, identification information of an IoT gateway to which the node 102 transfers the data packet, location information of the node 102, information representing a type of the node 102, and the like. However, these are merely exemplary, and a method for each node 102 to identify a group to which the node 102 belongs is not limited thereto.

Each node 102 may transfer a group key (or a node ID generated from the group key) thereof to an adjacent next node, and this process is repeated to transfer group keys (or node IDs) of individual nodes 102 to the node 102 at the highest level. The node 102 at the highest level transmits the group keys (or the node IDs) of the individual nodes 102 to the server 104, so that the group keys (or the node IDs) of the individual nodes 102 may be registered in the server 104.

In this way, group keys may not be generated or managed by the server 104 in a centralized manner and may be generated by individual nodes 102 and registered in the server 104. The server 104 may manage nodes 102 (i.e., IoT devices) in level 1 to level N by using a group key agreement protocol or a group key management protocol, such as skinny tree or tree-based group Diffie-Hellman (TGDH), according to a topology of a network to which the individual nodes 102 belong.

Figure 5:
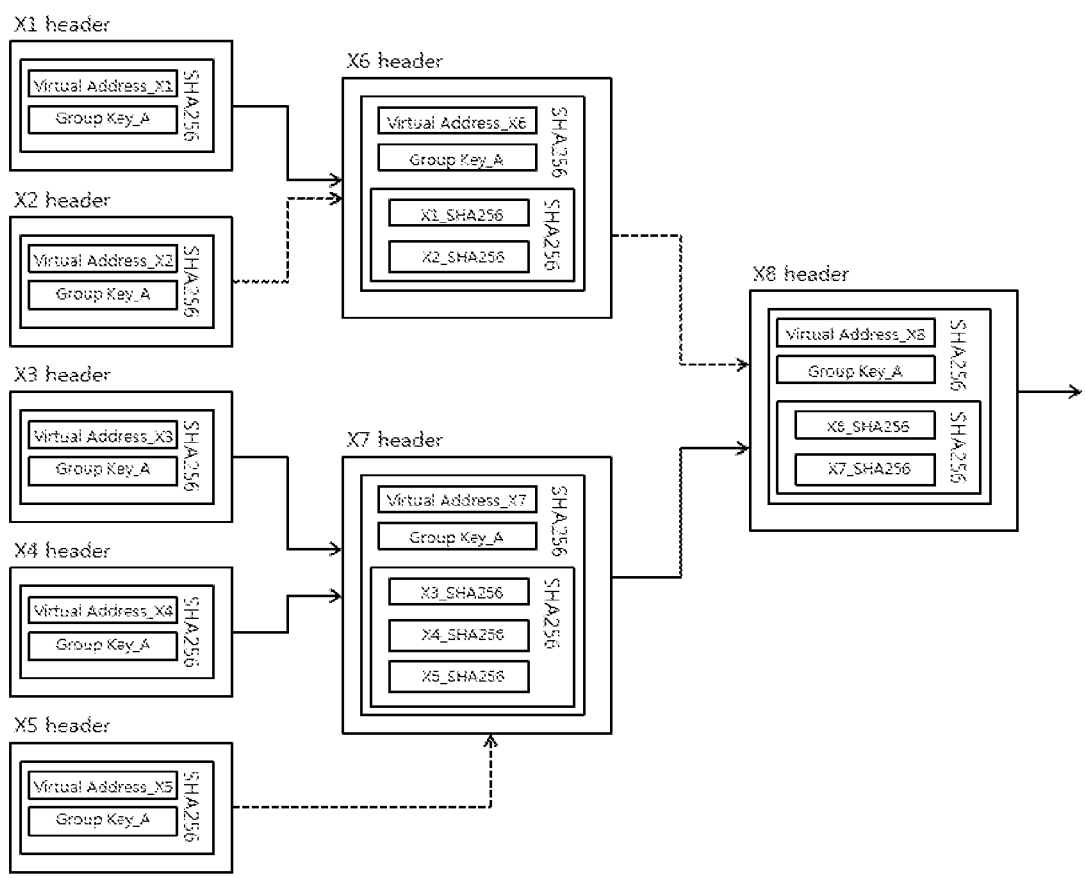
FIG. 5 is a diagram illustrating a process of forming a node chain according to an exemplary embodiment of the present disclosure.

FIG. 5 is a diagram illustrating a process of forming a node chain according to an exemplary embodiment of the present disclosure. As described above, a node chain may be formed among individual nodes 102, and a data packet may be sequentially transmitted along the node chain and finally transferred to a node 102 at the highest level. The node 102 at the highest level may transmit the data packet to the server 104. As described above, the node chain may be formed on the basis of signatures of the individual nodes 102. Here, the signatures may be included in headers of data packets transmitted by the nodes 102.

Referring to FIG. 5, node X1 may generate a signature of X1 by hashing (e.g., with the SHA256 algorithm) a node ID (e.g., Thing ID_X1) including a virtual address Virtual Address_X1 of X1 and a group key Group Key_A of a group to which X1 belongs, and node X2 may generate a signature of X2 by hashing a node ID (e.g., Thing ID_X2) including a virtual address Virtual Address_X2 of X2 and the group key Group Key_A of a group to which X2 belongs. Here, it is assumed that X1 to X8 all have the same group key Group Key_A.

Node X6 may generate a signature of X6 by hashing a virtual address Virtual Address_X6 of X6, the group key Group Key_A of a group to which X6 belongs, and hash values (i.e., hash values of the signatures of X1 and X2) of signatures of one or more adjacent previous nodes (i.e., X1 and X2).

Node X8 may generate a signature of X8 by hashing a virtual address Virtual Address_X8 of X8, the group key Group Key_A of a group to which X8 belongs, and hash values (i.e., hash values of the signature of X6 and a signature of X7) of signatures of one or more adjacent previous nodes (i.e., X6 and X7).

In this way, each node 102 may generate a signature thereof by hashing a node ID thereof when there is no previous node adjacent to the node 102, and may generate a signature thereof by hashing the node ID thereof and a hash value of a signature of at least one previous node when the at least one previous node is adjacent to the node.

Individual nodes 102 may be connected in series by using signatures thereof, and the following node chain may be formed of connecting links representing the connection relation between the individual nodes 102.

<Example of Node Chain>
X1|X2→X6
X3|X4|X5→X7
X6|X7→X8

("|" is a distinguisher for distinguishing two or more previous nodes connected to the same node, and "→" denotes a connecting link between individual nodes)

According to exemplary embodiments of the present disclosure, each node 102 generates a signature thereof on the basis of a node ID and information on an adjacent previous node, so that a node chain representing a topology of a network to which individual nodes 102 belong may be easily formed.

Each node 102 may transfer a data packet to a next node by using the node chain. Specifically, each node 102 may identify a next node adjacent thereto by analyzing the node chain and transfer the data packet to the identified next node. Through this process, the data packet may be transmitted to the server 104 via nodes 102 in the node chain.

A process of transferring a data packet through nodes in a node chain will be described in further detail below with reference to FIGS. 6 and 7.

Figure 6:
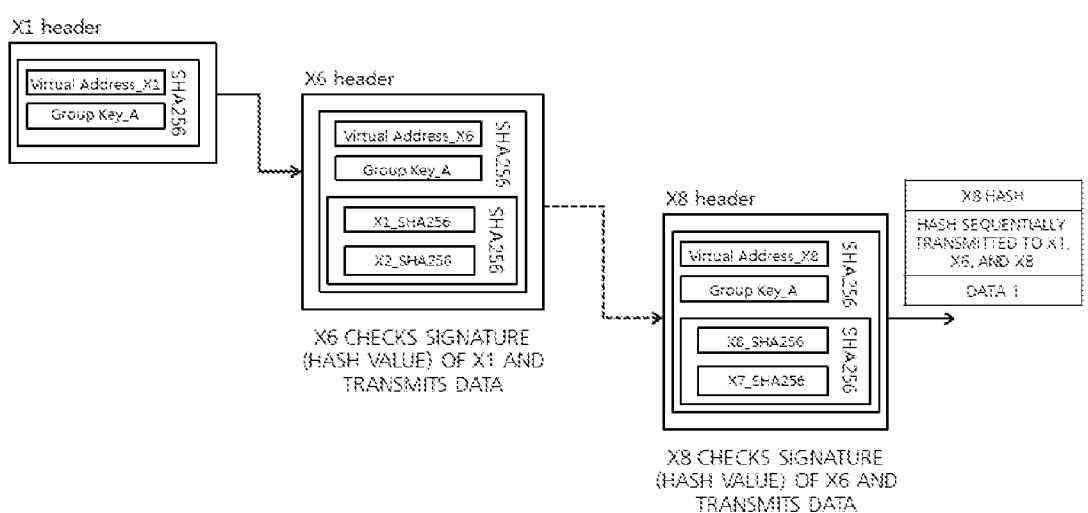
FIG. 6 is an example diagram showing headers of data packets transmitted by individual nodes according to an exemplary embodiment of the present disclosure.
Figure 7:
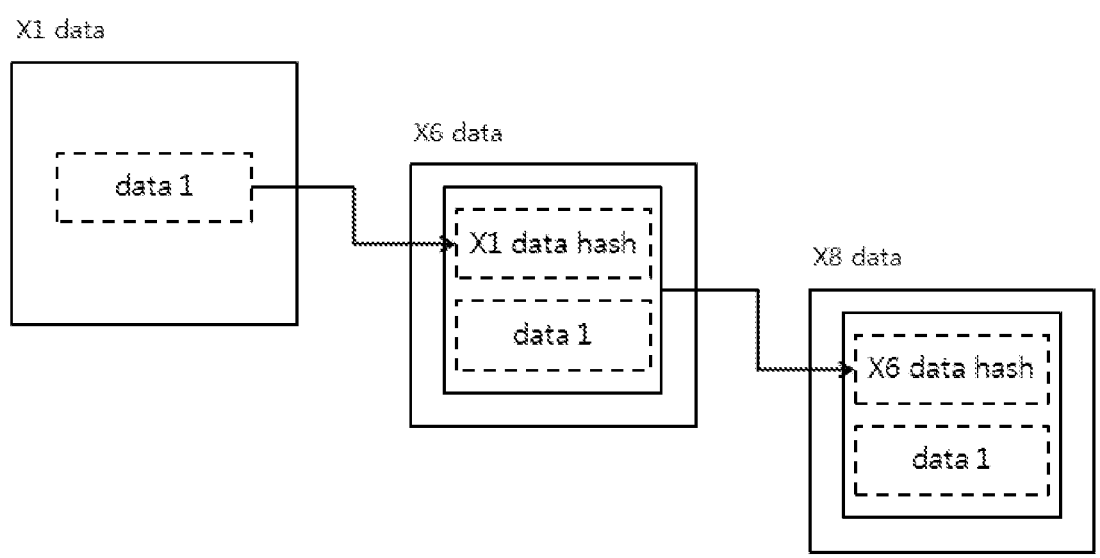
FIG. 7 is an example diagram showing bodies of data packets transmitted by individual nodes according to an exemplary embodiment of the present disclosure.

FIG. 6 is an example diagram showing headers of data packets transmitted by individual nodes 102 according to an exemplary embodiment of the present disclosure, and FIG. 7 is an example diagram showing bodies of data packets transmitted by individual nodes 102 according to an exemplary embodiment of the present disclosure. It is assumed below that a data packet is sequentially transferred to X1, X6, and X8.

As described above, each node 102 may identify a next node adjacent thereto by analyzing a node chain. As an example, node X1 may identify X6, which generates a signature thereof by using a signature of node X1 as a next node and transfer a data packet to X6.

At this time, each node 102 may receive a data packet including a data hash value and data from an adjacent previous node. At least a part of the data packet of the previous node may be hashed by using a signature of the previous node as a key to obtain the data hash value. As an example, data (e.g., data 1) included in a body of the data packet of node X1 may be hashed by using the signature of node X1 as a key to obtain a data hash value (e.g., X1 data hash) included in the data packet received by node X6. Also, data (e.g., X1 data hash and data 1) included in a body of the data packet of node X6 may be hashed by using a signature of node X6 as a key to obtain a data hash value (e.g., X6 data hash) included in a data packet received by node X8. The data may be data received from at least one previous node. As an example, data (e.g., data 1) included in the data packet received by node X6 may be data received from node X1, and data (e.g., data 1) included in the data packet received by node X8 may be data received from node X6.

In this case, a node 102 receiving a data packet may verify a data hash value included in the data packet received from a previous node by using a received signature of the previous node. As an example, X8 may verify the data hash value (e.g., X6 data hash) included in the data packet received from X6 by using a signature of a previous node, that is, the signature of X6.

When the data hash value is verified, a next node may receive a data packet including a data hash value and data from the node 102. When there is no next node, the server 104 may receive the data packet including the data hash value and the data from the node 102. In the above example, the server 104 may receive a data packet including a data hash value (e.g., X8 data hash) and data (data 1) from node X8. Data included in a body of the data packet of node X8 may be hashed by using the signature of node X8 as a key to obtain the data hash value (e.g., X8 data hash).

In other words, each node 102 may receive a data packet from a previous node and determine whether corresponding data has been received normally by verifying a data hash value included in the data packet with a signature of the previous node. In such a process, a data packet may pass through individual nodes in the node chain and be sequentially transferred to the node 102 at the highest level and the server 104. In the above example, information acquired from node X8 at the highest level by the server 104 is shown in Table 1 below.

TABLE 1

X8 hash
X1 hash → X6 hash → Hash transmitted to X8
Data 1

Although it has been described that data 1 transmitted from X1 passes through X6 and X8 and is transmitted to the server 104, this is merely exemplary, and two or more pieces of data (e.g., data 1, data 2, and the like) may pass through nodes 102 in the node chain and be transmitted to the server 104. Also, when a specific node 102 (e.g., X6) functions as an aggregator, the corresponding node 102 (e.g., X6) may collect two or more different pieces of data (e.g., data 1, data 2, and the like) and transfer the collected pieces of data to a next node (e.g., X8). In this case, data received by the next node (e.g., X8) may be data 6 (data 1+data 2) and X6 hash data (X1 hash data and hash values of data 1 and data 2).

According to exemplary embodiments of the present disclosure, when the above-described data transmission technique is used, it is possible to use a unique protocol used by an IoT device 102 as it is, without changing the protocol, and the above-described data transmission technique may be used as an additional process for receiving a specific cloud service. Also, software or firmware for implementing this data transmission technique may be developed through a software development kit (SDK) for IoT devices, and accordingly, it is possible to easily perform communication with a server which provides a cloud service and communication between individual IoT devices.

Figure 8:
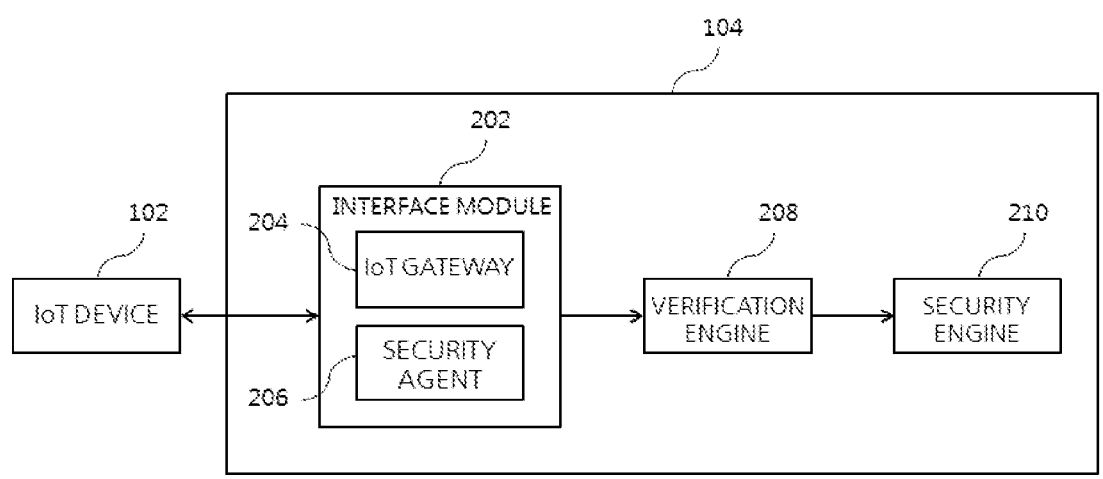
FIG. 8 is a block diagram showing a detailed configuration of a server according to an exemplary embodiment of the present disclosure.

FIG. 8 is a block diagram showing a detailed configuration of the server 104 according to an exemplary embodiment of the present disclosure. As shown in FIG. 8, the server 104 according to an exemplary embodiment of the present disclosure includes an interface module 202, a verification engine 208, and a security engine 210.

The interface module 202 is a portion in charge of interfacing with an IoT device 102 (i.e., a node) and may exchange data packets with the IoT device 102. The interface module 202 may be a virtual machine which performs the interface function and may include an IoT gateway 204 and a security agent 206.

The IoT gateway 204 is a module for collecting a data packet transmitted from the IoT device 102 and transmitting various signals transmitted from the server 104 to the IoT device 102, and may be an application level gateway by way of example.

The security agent 206 is a module for sensing a data packet and may be a security sensor by way of example. The security agent 206 may support, other than an application level, low-level functions as well.

The verification engine 208 is a module for authenticating the data packet received by the server 104 and IoT devices 102 which transmit the data packet.

The security engine 210 is a module for processing the data packet received by the server 104, and may analyze the data packet and block the data packet when the data packet is an unauthorized packet or an abnormal packet.

Figure 9:
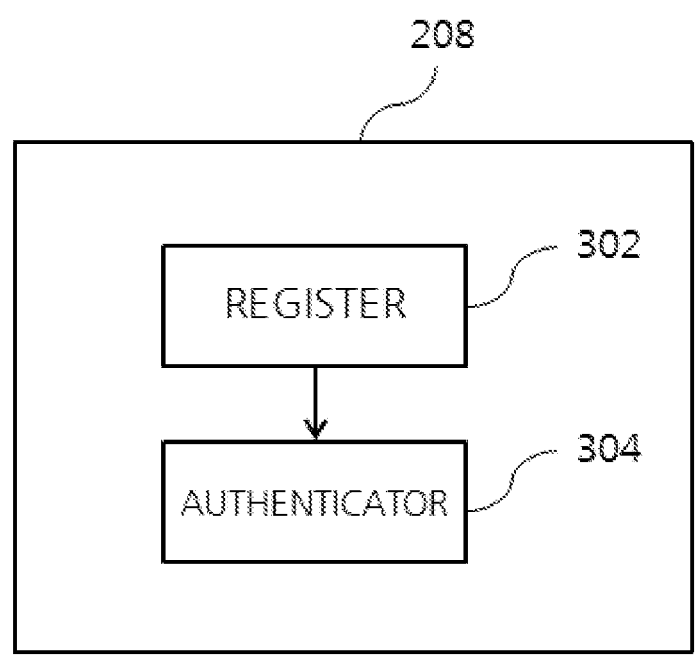
FIG. 9 is a block diagram showing a detailed configuration of a verification engine according to an exemplary embodiment of the present disclosure.

FIG. 9 is a block diagram showing a detailed configuration of a verification engine according to an exemplary embodiment of the present disclosure. As shown in FIG. 9, the verification engine 208 according to an exemplary embodiment of the present disclosure includes a register 302 and an authenticator 304.

The register 302 registers node IDs of individual nodes 102. As described above, a node ID may include at least one of a virtual address for identifying a corresponding node 102 and a group key for identifying a group to which the node 102 belongs. Each node 102 may generate a node ID from a combination of a virtual address and a group key and transfer the node ID to a next node along a node chain. A node 102 at the highest level may transmit node IDs of individual nodes 102 to the server 104. The register 302 may register the node IDs of the individual nodes 102, and the nodes IDs may be used to authenticate the individual nodes 102.

Also, the register 302 may register signatures of the individual nodes 102. As described above, a signature may be generated from a combination of at least one of a node ID and information on a previous node adjacent to a corresponding node 102, and may be a hash-based signature by way of example. Each node 102 may generate a signature using at least one of a node ID and information on a previous node adjacent thereto, include the signature in a data packet, and transfer the data packet to a next node. A node 102 at the highest level may transmit the data packet including the signature to the server 104. The register 302 may register signatures of individual nodes 102, and the signatures may be used to authenticate a data packet received from a node 102 and a path through which the data packet is transmitted.

Further, the register 302 may manage the registered node IDs and signatures of the individual nodes 102. The register 302 may manage session information exchanged with the individual nodes 102 in a process of registering the node IDs and the signatures, distribution information of node-specific group keys, and the like, and update these pieces of information every time a node ID or a signature is updated.

The authenticator 304, using the registered node IDs and signatures, authenticates a data packet and nodes 102 which transmit the data packet. The authenticator 304 may authenticate the nodes 102 which transmit the data packet using the registered node IDs of the individual nodes 102. Also, the authenticator 304 may verify a data hash value included in the data packet by using a registered signature of each node 102 and accordingly authenticate data included in the data packet. Further, the authenticator 304 may determine the data packet to be an unauthorized packet when authentication of the data packet fails or a format of the data packet differs from a set format.

Figure 10:
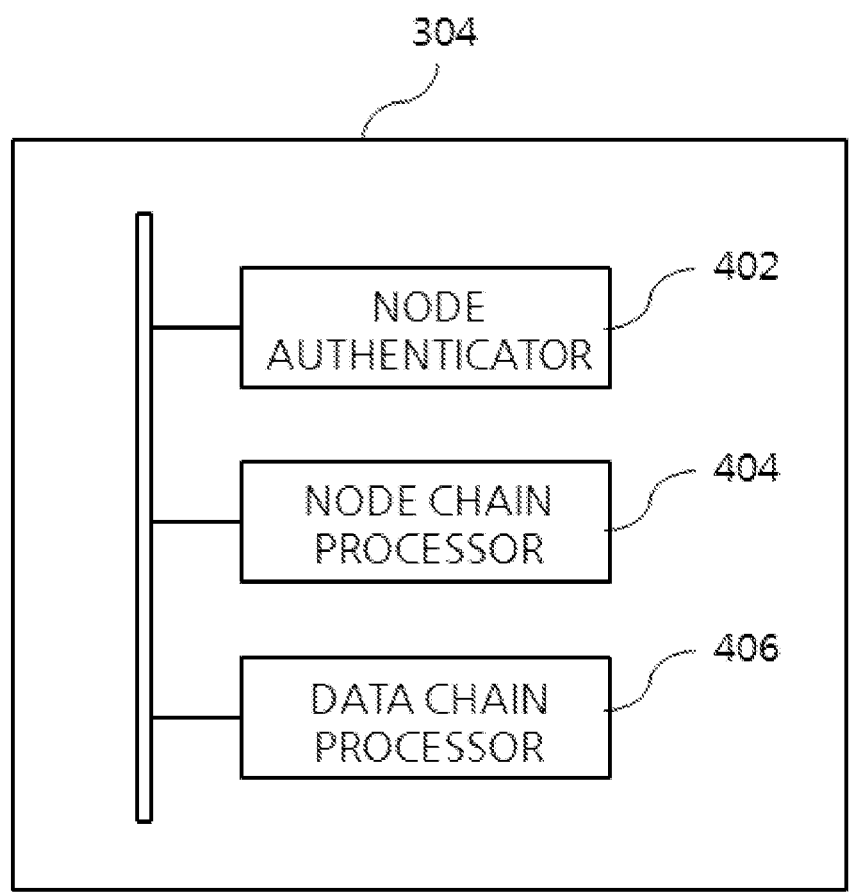
FIG. 10 is a block diagram showing a detailed configuration of an authenticator according to an exemplary embodiment of the present disclosure.

FIG. 10 is a block diagram showing a detailed configuration of the authenticator 304 according to an exemplary embodiment of the present disclosure. As shown in FIG. 10, the authenticator 304 according to an exemplary embodiment of the present disclosure includes a node authenticator 402, a node chain processor 404, and a data chain processor 406.

The node authenticator 402 authenticates nodes 102 which transmit a data packet. Specifically, the node authenticator 402 may authenticate nodes which transmit a data packet by using virtual addresses, group keys, node IDs, and the like registered in the server 104. As an example, the node authenticator 402 may receive a node ID including at least one of a virtual address and a group key of each node 102 together with authentication request information from the corresponding node 102, and perform authentication of the node 102 by comparing the received node ID with a registered node ID. As another example, the node 102 may generate an electronic signature value for the node ID and transmit authentication request information, the node ID, and the electronic signature value to the server 104. The node authenticator 402 may generate an electronic signature value for a node ID of the corresponding node 102 registered in the server 104 and perform authentication of the corresponding node 102 by comparing the generated electronic signature value with the received electronic signature value.

Also, the node authenticator 402 may perform authentication of a node 102 using an authentication key as necessary. To this end, the register 302 may issue an authentication key to each node 102 when registering a node ID. Specifically, the register 302 may receive registration request information from a node 102 in an initial communication session with the node 102, generate an authentication key accordingly, and transmit the authentication key to the node 102. Subsequently, the node authenticator 402 may receive authentication request information and the authentication key from the node 102 and perform authentication of the node 102 by comparing the received authentication key with the authentication key registered in the server 104. Also, the node 102 may generate an electronic signature value for the authentication key and transmit authentication request information, the authentication key, and the electronic signature value to the server 104. The node authenticator 402 may generate an electronic signature value for the authentication key registered in the server 104 and perform authentication of the node 102 by comparing the generated electronic signature value with the received electronic signature value. The above-described authentication of the node 102 through issuing an authentication key may be omitted as necessary. The above-described authentication method of the node authenticator 402 is merely exemplary, and an authentication method of the node authenticator 402 is not limited thereto.

The node chain processor 404 authenticates a path of nodes 102 in which a data packet is transferred. As described above, a data packet is sequentially transferred along a node chain formed on the basis of signatures of individual nodes 102 and finally transferred to the node 102 at the highest level, and the node 102 at the highest level may transfer the data packet to the server 104. The node chain processor 404 may authenticate the path of nodes 102 in which the data packet is actually transferred by using signatures of individual nodes 102 (or a signature of the node 102 at the highest level) registered in the server 104.

In the above example, when the node 102 at the highest level transmitting the data packet to the server 104 is X8 and a data hash value included in the data packet transmitted by X8 is "X8 data hash," the node chain processor 404 may verify whether data transmitted from node X8 is received normally by checking a header of the data packet transmitted from node X8 and verifying "X8 data hash."

As described above, since individual nodes 102 verify and transmit a header and data of a data packet to the server 104 using signatures and hash values when the data packet is transmitted between nodes 102, the individual nodes 102 as well as the server 104 are able to verify the data packet, and an unverified node is not able to transmit the data packet. In other words, according to exemplary embodiments of the present disclosure, a data packet is not only verified by the server 104 but also authenticated and verified by individual nodes in a decentralized manner. Therefore, the data packet may be safely transmitted to the server 104, and the server 104 may receive the verified data packet.

In the above example, when verification of "X8 data hash" fails, the node chain processor 404 may determine that the data packet has not been transferred along the node chain normally (i.e., authentication failure).

The data chain processor 406 authenticates a data packet transmitted to the server 104. The data chain processor 406 may verify a data hash value included in the data packet by using signatures of individual nodes 102 (or a signature of a node 102 at the highest level) registered in the server 104 to authenticate the data packet transmitted to the server 104.

In the above example, when verification of "X8 data hash" fails, the data chain processor 406 may determine that the received data packet is an unauthorized packet and that authentication of the data packet has failed.

According to exemplary embodiments of the present disclosure, each node 102 transmits a data packet to the server 104 using the node chain, and the server 104 authenticates the data packet and nodes 102 which have transmitted the data packet by using registered node IDs of the individual nodes 102 and signatures of the individual nodes 102, so that the probability of access by an unauthorized packet and an abnormal packet may be remarkably reduced.

Figure 11:
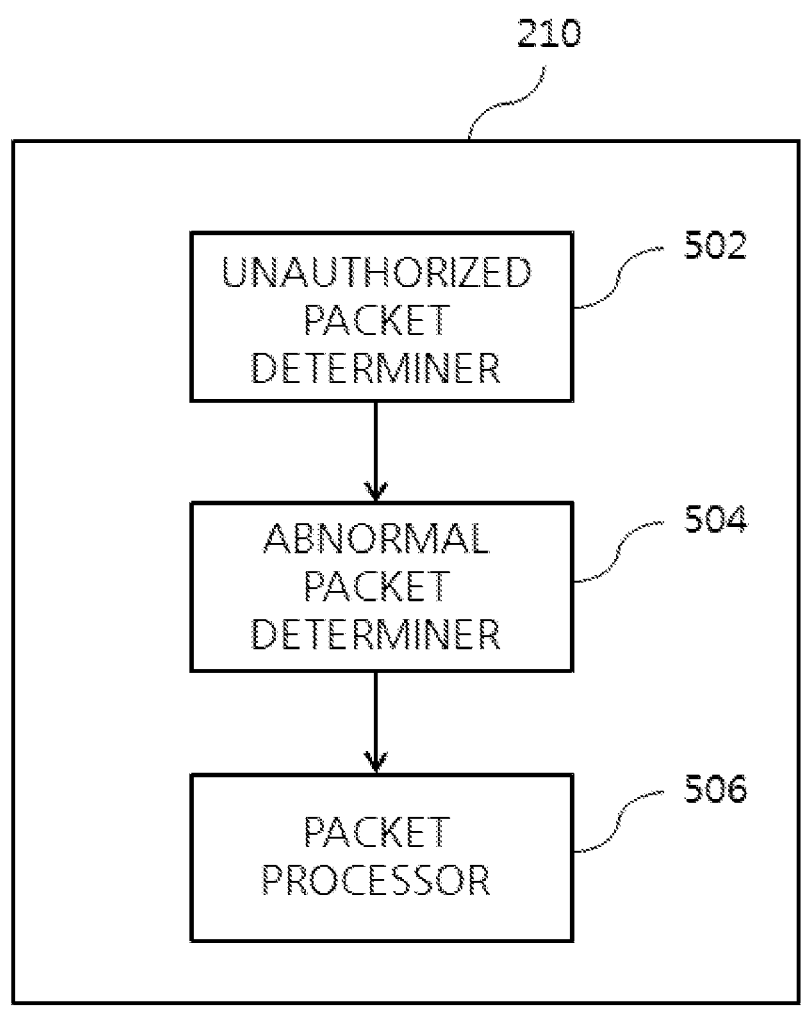
FIG. 11 is a block diagram showing a detailed configuration of a security engine according to an exemplary embodiment of the present disclosure.

FIG. 11 is a block diagram showing a detailed configuration of the security engine 210 according to an exemplary embodiment of the present disclosure. As shown in FIG. 11, the security engine 210 according to an exemplary embodiment of the present disclosure includes an unauthorized packet determiner 502, an abnormal packet determiner 504, and a packet processor 506.

The unauthorized packet determiner 502 determines a data packet to be an unauthorized packet and collects the unauthorized packet when authentication of the data packet or nodes 102 which transmit the data packet fails or a format of the data packet differs from the set format. As described above, the authenticator 304 may authenticate a data packet or nodes 102 which transmit the data packet. When authentication of the data packet or the nodes 102 which transmit the data packet fails, the authenticator 304 may transmit the data packet which has failed to be authenticated to the packet determiner 502.

Also, a data packet is transferred along a node chain and has a format of a standardized data packet. For example, a signature of a node 102 may be included in a header of a data packet, and a data hash value and data may be included in a body of the data packet. When a format of a data packet differs from the set format, the authenticator 304 may transmit the data packet to the unauthorized packet determiner 502. The unauthorized packet determiner 502 may determine the data packet collected from the authenticator 304, that is, a data packet which has failed to be authenticated or a data packet having a format different from the set format, to be an unauthorized packet.

The abnormal packet determiner 504 detects abnormal traffic, an abnormal behavior, abnormal data flow, and the like from all data packets received by the server 104. The abnormal packet determiner 504 may determine an abnormal packet using various abnormality detection techniques such as statistical analysis, density-based analysis, isolation forest analysis, supervised learning, unsupervised learning, and the like.

The packet processor 506 collects unauthorized packets and abnormal packets and detects a malicious pattern by analyzing the unauthorized packets and the abnormal packets. The packet processor 506 may detect a malicious pattern by comparing patterns of a collected unauthorized packet and abnormal packet with pre-stored patterns, but a method of detecting a malicious pattern in the packet processor 506 is not limited thereto. The packet processor 506 may detect a malicious pattern by using various methods widely known in this technical field. The packet processor 506 may block access by a data packet including a malicious pattern. Also, the packet processor 506 may transmit an instruction to block access by a data packet including a malicious pattern to the security agent 206 or the verification engine 208.

Figure 12:
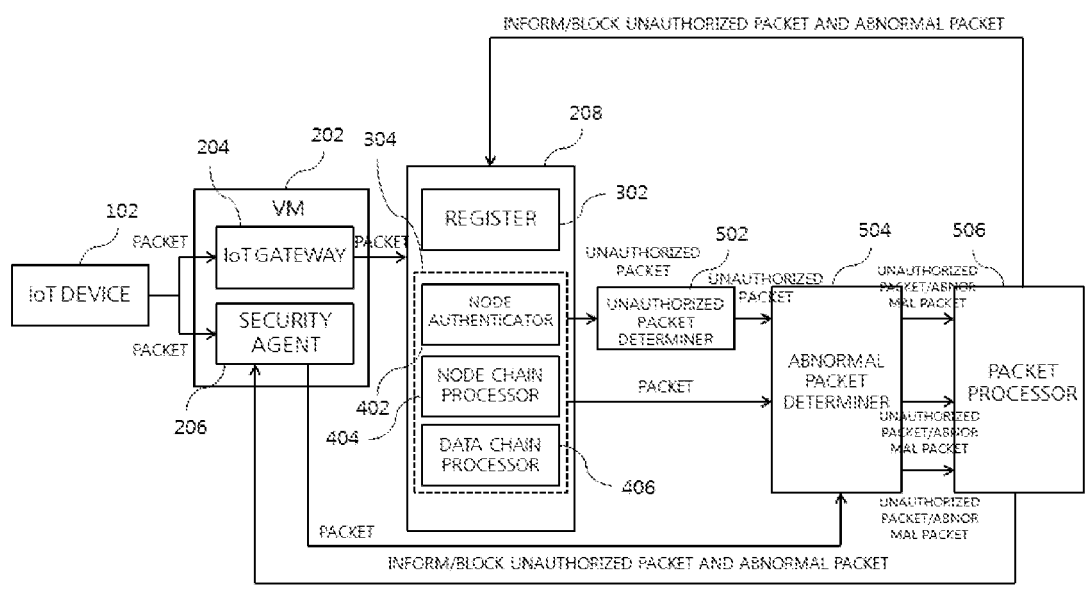
FIG. 12 is a diagram illustrating a process of transferring and processing a data packet according to an exemplary embodiment of the present disclosure.

FIG. 12 is a diagram illustrating a process of transferring and processing a data packet according to an exemplary embodiment of the present disclosure.

Referring to FIG. 12, the verification engine 208 of the server 104 may authenticate data packets collected through the IoT gateway 204 and transfer a data packet which has failed to be authenticated or a data packet having a format different from the set format to the unauthorized packet determiner 502. The unauthorized packet determiner 502 may determine the data packet received from the verification engine 208 to be an unauthorized packet and transfer the unauthorized packet to the abnormal packet determiner 504. The abnormal packet determiner 504 may determine whether a data packet which has not passed through the unauthorized packet determiner 502 among data packets collected by the verification engine 208, a data packet sensed by the security agent 206, and the like as well as the data packet received from the unauthorized packet determiner 502 correspond to abnormal packets. In other words, the abnormal packet determiner 504 may detect abnormal traffic, an abnormal behavior, abnormal data flow, and the like from all data packets transmitted to the server 104. Subsequently, the packet processor 506 may detect a malicious pattern by analyzing patterns of an unauthorized packet and an abnormal packet received from the abnormal packet determiner 504. When the packet processor 506 detects a malicious pattern, the packet processor 506 may block a data packet including the malicious pattern or transmit an instruction to block the data packet to the verification engine 208 or the security agent 206. The verification engine 208 may control data collection of the IoT gateway 204 according to the instruction, and the security agent 206 may sense and block a data packet including the malicious pattern according to the instruction.

Figure 13:
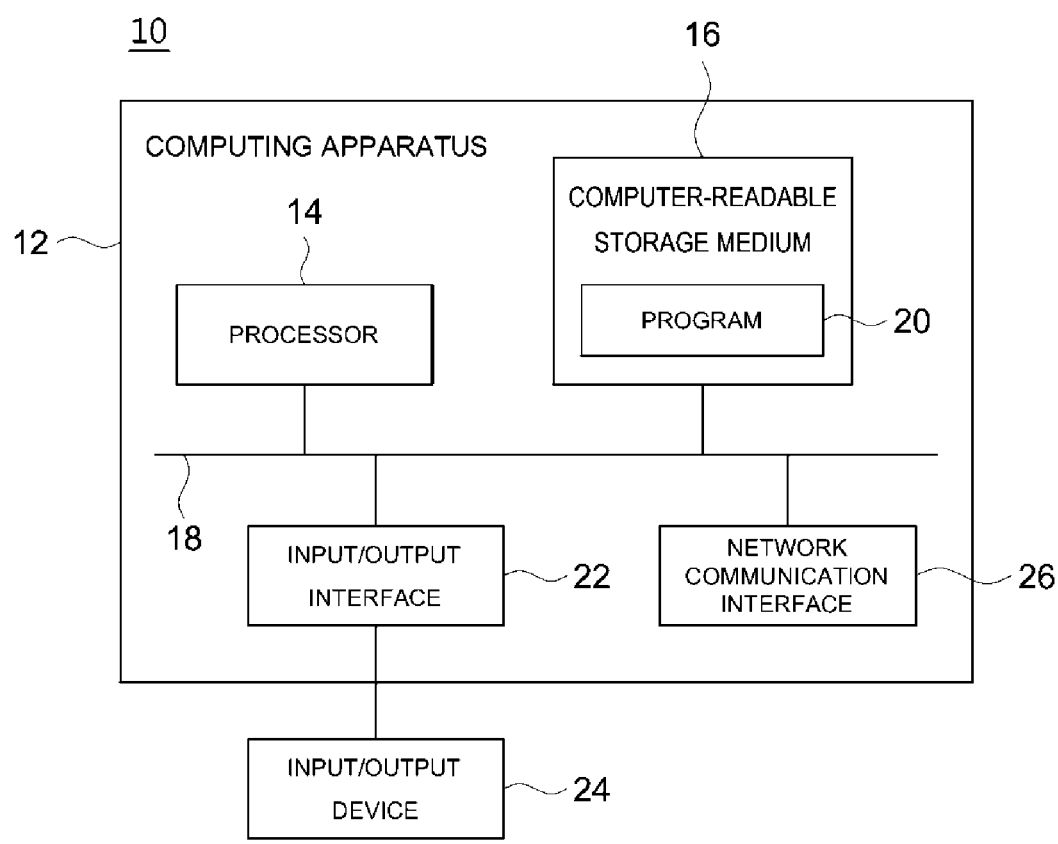
FIG. 13 is a block diagram illustrating an example of a computing environment including a computing device appropriate for use in exemplary embodiments.

FIG. 13 is a block diagram illustrating an example of a computing environment 10 including a computing device appropriate for use in exemplary embodiments. In the exemplary embodiment shown in the drawing, each component may have functions and capabilities other than those described below, and an additional component other than the components described below may be included.

The computing environment 10 shown in the drawing includes a computing device 12. In an exemplary embodiment, the computing device 12 may be the authentication system 100 or one or more components included in the authentication system 100, for example, a node 102, the server 104, and the like.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause the computing device 12 to perform operations according to an exemplary embodiment when executed by the processor 14.

The computer-readable storage medium 16 is configured to store computer-executable instructions or program codes, program data, and/or information in other appropriate forms. A program 20 stored in the computer-readable storage medium 16 includes a set of instructions executable by the processor 14. In an exemplary embodiment, the computer-readable storage medium 16 may be a memory (a volatile memory such as a random access memory (RAM), a non-volatile memory, or an appropriate combination thereof), one or more magnetic disk storage devices, optical disk storage devices, flash memory devices, another form of storage medium which is accessible by the computing device 12 and capable of storing desired information, or an appropriate combination thereof.

The communication bus 18 connects various other components of the computing device 12 including the processor 14 and the computer-readable storage medium 16 to each other.

The computing device 12 may also include one or more input/output interfaces 22 for one or more input/output devices 24 and one or more network communication interfaces 26. The input/output interfaces 22 and the network communication interfaces 26 are connected to the communication bus 18. The input/output devices 24 may be connected to other components of the computing device 12 via the input/output interfaces 22. Examples of the input/output devices 24 may include input devices such as a pointing device (a mouse, a trackpad, and the like), a keyboard, a touch input device (a touchpad, a touch screen, and the like), a voice or sound input device, various types of sensor devices, and/or a photographing device, and/or output devices such as a display device, a printer, a speaker, and/or a network card. An example of the input/output devices 24 may be included in the computing device 12 as a component constituting the computing device 12 or may be connected to the computing device 12 as a separate device distinguished from the computing device 12.

Figure 14:
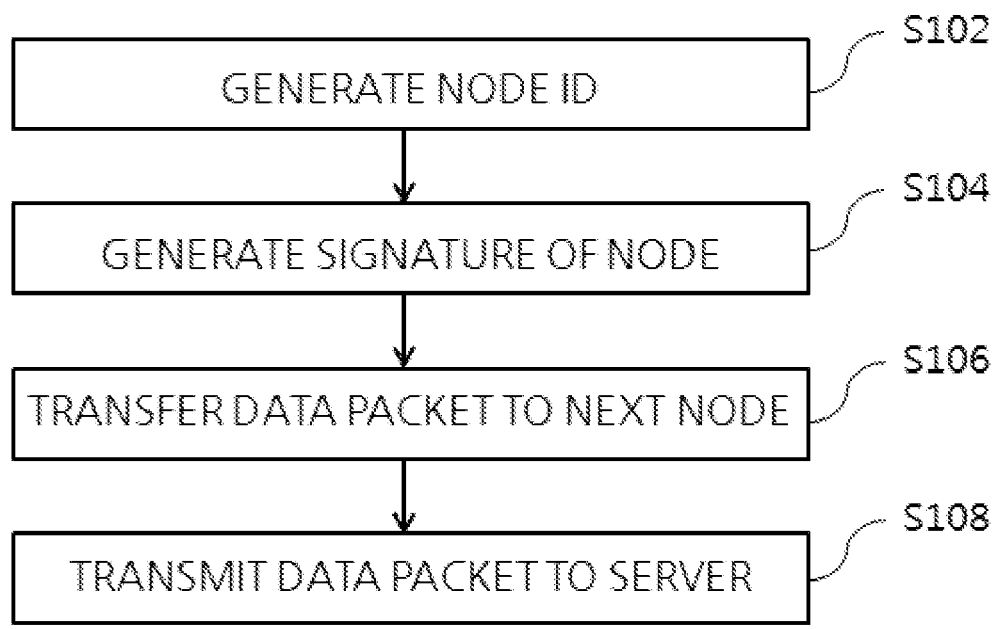
FIG. 14 is a flowchart illustrating a data transmission method according to an exemplary embodiment of the present disclosure.

FIG. 14 is a flowchart illustrating a data transmission method according to an exemplary embodiment of the present disclosure. The method shown in FIG. 14 may be performed by the above-described nodes 102 by way of example. Although the flowchart shown in the drawing illustrates the method as a plurality of operations, at least some operations may be performed in a different order, performed in combination with other operations, omitted, or subdivided and performed, or one or more operations which are not shown in the drawing may be additionally performed.

In operation S102, each node 102 generates a node ID thereof. As described above, a node ID may include at least one of a virtual address for identifying a corresponding node 102 and a group key for identifying a group to which the node 102 belongs.

In operation S104, each node 102 generates a signature thereof. As an example, when there is no previous node adjacent to a node 102, the node 102 may generate a signature thereof by hashing a node ID thereof. Also, when there is a previous node adjacent to a node 102, the node 102 may generate a signature thereof by hashing a node ID thereof and a hash value of a signature of at least one previous node. Further, when the connection of individual nodes 102 is changed, each node 102 may regenerate a signature thereof.

In operation S106, each node 102 may transfer a data packet to an adjacent next node. As described above, a node chain may be formed on the basis of signatures of individual nodes 102, and each node 102 may identify a next node adjacent thereto by analyzing the node chain and then transfer the data packet to the next node. Here, a body of the data packet of the previous node may be hashed by using a signature of the previous node as a key to obtain a data hash value included in the data packet received from a previous node.

In operation S108, a node 102 at the highest level transmits the data packet to the server 104.

Figure 15:
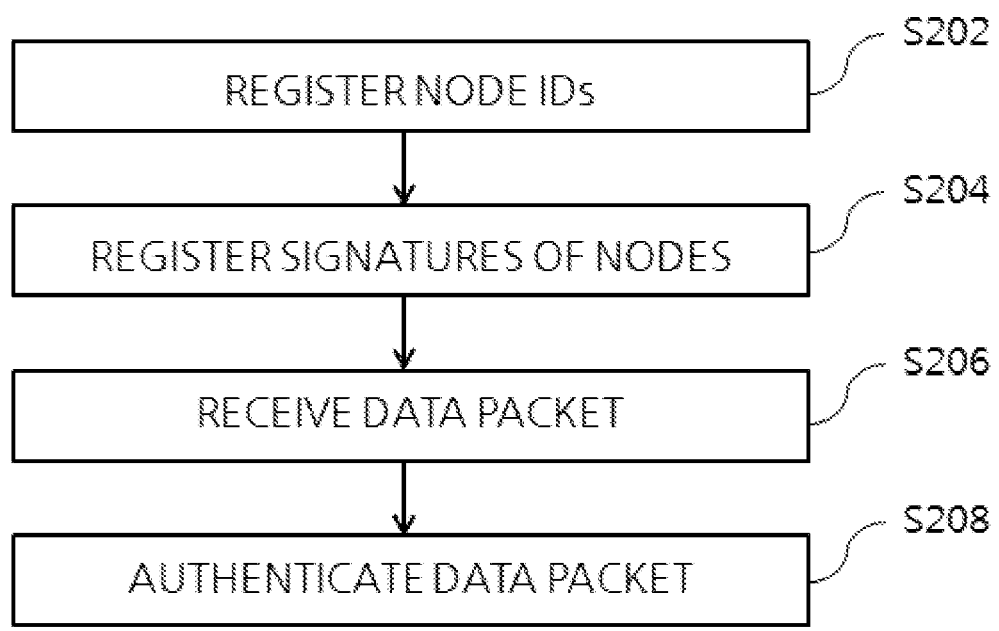
FIG. 15 is a flowchart illustrating an authentication method according to an exemplary embodiment of the present disclosure.

FIG. 15 is a flowchart illustrating an authentication method according to an exemplary embodiment of the present disclosure. The method shown in FIG. 15 may be performed by the above-described server 104 by way of example. Although the flowchart shown in the drawing illustrates the method as a plurality of operations, at least some operations may be performed in a different order, performed in combination with other operations, omitted, or subdivided and performed, or one or more operations which are not shown in the drawing may be additionally performed.

In operation S202, the server 104 registers node IDs of individual nodes 102. Each node 102 may generate a node ID from a combination of a virtual address and a group key and transfer the node ID to a next node along a node chain. Subsequently, a node 102 at the highest level may transmit a node ID of each node 102 to the server 104.

In operation S204, the server 104 registers a signature of each node 102. Each node 102 may generate a signature by using at least one of a node ID and information on a previous node adjacent to the node 102, include the signature in the data packet, and transfer the data packet to a next node. The node 102 at the highest level may transmit the data packet including the signature to the server 104.

In operation S206, the server 104 receives the data packet from the node 102 at the highest level.

In operation S208, the server 104 authenticates the received data packet. As described above, the server 104 may verify a data hash value included in the data packet received from the node 102 at the highest level by using a registered signature of the node 102 at the highest level to authenticate the data packet. Also, the server 104 may authenticate the nodes 102 by using the registered node IDs.

According to exemplary embodiments of the present disclosure, each node generates a signature on the basis of a node ID and information on an adjacent previous node, so that a node chain representing a topology of a network to which individual nodes belong can be easily formed.

Also, according to exemplary embodiments of the present disclosure, each node transmits a data packet to a server using the node chain, and signatures of individual nodes registered in the server are used to authenticate the data packet, so that accessibility of an unauthorized packet and an abnormal packet can be remarkably reduced.

Although exemplary embodiments of the present disclosure have been described in detail above, those of ordinary skill in the art to which the present disclosure pertains will appreciate that various modifications may be made without departing from the scope of the present disclosure. Therefore, the scope of the present disclosure is to be determined by the following claims and their equivalents, and is not limited by the described exemplary embodiments.

What is claimed is:

1. A data transmission method performed by a node among a plurality of nodes connected in a hierarchical structure, the method comprising:
   generating a node identity (ID) comprising at least one from among a virtual address for identifying the node and a group key for identifying a group to which the node belongs;
   generating a signature of the node by using at least one from among the node ID and information about a previous node adjacent to the node; and
   transmitting a data packet to a server using a node chain formed based on a signature of each of the nodes,
   wherein the information about the previous node comprises a signature of the previous node, and
   wherein the transmitting of the data packet to the server comprises:
   receiving, by the node, the data packet from the previous node adjacent to the node;
   verifying, by the node, a data hash value included in the data packet received from the previous node by using the signature of the previous node; and
   receiving, by a next node adjacent to the node, the data packet from the node in response to the data hash value being verified.

2. The data transmission method of claim 1, wherein the generating of the signature of the node comprises generating the signature of the node by hashing the node ID in response to there being no previous node adjacent to the node, and generating the signature of the node by hashing the node ID and a hash value of a signature of at least one previous node in response to the at least one previous node being adjacent to the node.

3. The data transmission method of claim 1, wherein the generating of the signature of the node comprises regenerating the signature of the node in response to a connection of the nodes changing.

4. The data transmission method of claim 1, wherein at least a part of the data packet of the previous node is hashed to obtain the data hash value by using the signature of the previous node as a key.

5. An authentication method performed by a server connected to a node among a plurality of nodes connected in a hierarchical structure, the method comprising:
   registering node identities (IDs) of the nodes including at least one from among virtual addresses for identifying the nodes and group keys for identifying groups to which the nodes belong;
   registering a signature of each of the nodes generated from combinations of at least one from among the node IDs and information on previous nodes adjacent to the nodes;
   receiving a data packet including a data hash value and data from a node at a highest level; and
   authenticating the data packet transmitted along a node chain formed based on the signature of each of the nodes by using the registered signatures,
   wherein the information on the previous nodes comprises signatures of the previous nodes, and
   wherein at least a part of the data packet of the node at the highest level is hashed to obtain the data hash value by using a signature of the node at the highest level as a key.

6. The authentication method of claim 5, wherein the signature of each of the nodes is a hash value of a corresponding node ID in response to there being no previous node adjacent to the node, and is a value obtained by hashing the node ID and a hash value of a signature of at least one previous node in response to the at least one previous node being adjacent to the node.

7. The authentication method of claim 5, wherein the registered signature of each of the nodes are updated in response to a connection of the nodes changing.

8. The authentication method of claim 5, wherein the authenticating of the data packet comprises verifying the data hash value by using the registered signature of the node at the highest level to authenticate the data packet.

9. The authentication method of claim 5, further comprising:
after the authenticating of the data packet, determining the data packet to be an unauthorized packet in response to the authentication of the data packet failing or a format of the data packet differing from a set format.

10. A server connected to a node among a plurality of nodes connected in a hierarchical structure, the server comprising at least one hardware processor configured to implement:
a register configured to:
register node identities (IDs) of the nodes, the node IDs comprising at least one from among virtual addresses for identifying the nodes and group keys for identifying groups to which the nodes belong; and
register a signature of each of the nodes generated from combinations of at least one from among the node IDs and information about previous nodes adjacent to the nodes; and
an authenticator configured to authenticate a data packet transmitted along a node chain formed based on the signature of each of the nodes by using the registered signatures, wherein the information about the previous nodes comprises signatures of the previous node, and wherein the authenticator is further configured to receive the data packet including a data hash value and data from a node at a highest level, wherein at least a part of the data packet of the node at the highest level is hashed by using a signature of the node at the highest level as a key to obtain the data hash value.

11. The server of claim 10, wherein the signature of each of the nodes is a hash value of a corresponding node ID in response to there being no previous node adjacent to the node, and is a value obtained by hashing the node ID and a hash value of a signature of at least one previous node in response to the at least one previous node being adjacent to the node.

12. The server of claim 10, wherein the registered signature of each of the nodes are updated in response to a connection of the nodes changing.

13. The server of claim 10, wherein the authenticator is further configured to verify the data hash value by using the signature of the node at the highest level to authenticate the data packet.

14. The server of claim 10, further comprising:
an unauthorized packet determiner configured to determine the data packet to be an unauthorized packet in response to the authentication of the data packet failing or a format of the data packet differing from a set format.

* * * * *